US011899725B1

(12) United States Patent
Kropelin et al.

(10) Patent No.: US 11,899,725 B1
(45) Date of Patent: Feb. 13, 2024

(54) CONTINUOUS FILE METADATA REFRESH FOR FILE GATEWAY

(71) Applicant: Amazon Technologies, Inc., Seattle, WA (US)

(72) Inventors: Adam Daniel Kropelin, Boston, MA (US); John M Jamail, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 16/696,324

(22) Filed: Nov. 26, 2019

(51) Int. Cl.
*G06F 16/9035* (2019.01)
*G06F 16/23* (2019.01)
*G06F 16/9038* (2019.01)

(52) U.S. Cl.
CPC ...... *G06F 16/9035* (2019.01); *G06F 16/2379* (2019.01); *G06F 16/9038* (2019.01)

(58) Field of Classification Search
None
See application file for complete search history.

(56) References Cited

U.S. PATENT DOCUMENTS

| | | | |
|---|---|---|---|
| 6,192,365 B1* | 2/2001 | Draper | G06F 9/466 707/648 |
| 2014/0207635 A1* | 7/2014 | Pappas | G06Q 10/109 705/32 |
| 2014/0337483 A1* | 11/2014 | Sorenson, III | G06F 16/183 709/219 |
| 2015/0006548 A1* | 1/2015 | Huang | G06N 5/04 707/749 |
| 2017/0126552 A1* | 5/2017 | Pfaff | H04L 45/38 |
| 2017/0317904 A1* | 11/2017 | Rasanen | H04W 28/0263 |

* cited by examiner

*Primary Examiner* — Kris E Mackes
*Assistant Examiner* — Soheila (Gina) Davanlou
(74) *Attorney, Agent, or Firm* — Davis Wright Tremaine LLP

(57) ABSTRACT

Systems and methods are described herein for more efficiently updating a data directory, which maps data objects stored by a data storage service, such as maintained by on premise computing resources of a client of the data storage service. In one example, event data corresponding to operations performed on a plurality of data objects stored in a data storage partition of a data storage service may be obtained. A set of data objects relevant to a directory maintained locally by a client device may be determined. The event data may be filtered, such as by removing entries of the plurality of entries not corresponding to the set of data objects. The filtered event data may then be stored or pushed to a client device, to cause the directory to be updated, without requiring a full examination of the data storage partition.

20 Claims, 8 Drawing Sheets

CONTINUOUS FILE METADATA REFRESH FOR FILE GATEWAY

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Various entities may utilize services and data storage provided by computing resource providers in addition to localized computing resources to manage data, execute enterprise applications, and so on. Further improvements can be made to facilitate these different systems interacting to a greater extent to improve the customer experience.

BRIEF DESCRIPTION OF THE DRAWINGS

Various techniques will be described with reference to the drawings, in which.

DETAILED DESCRIPTION

Figure 1:
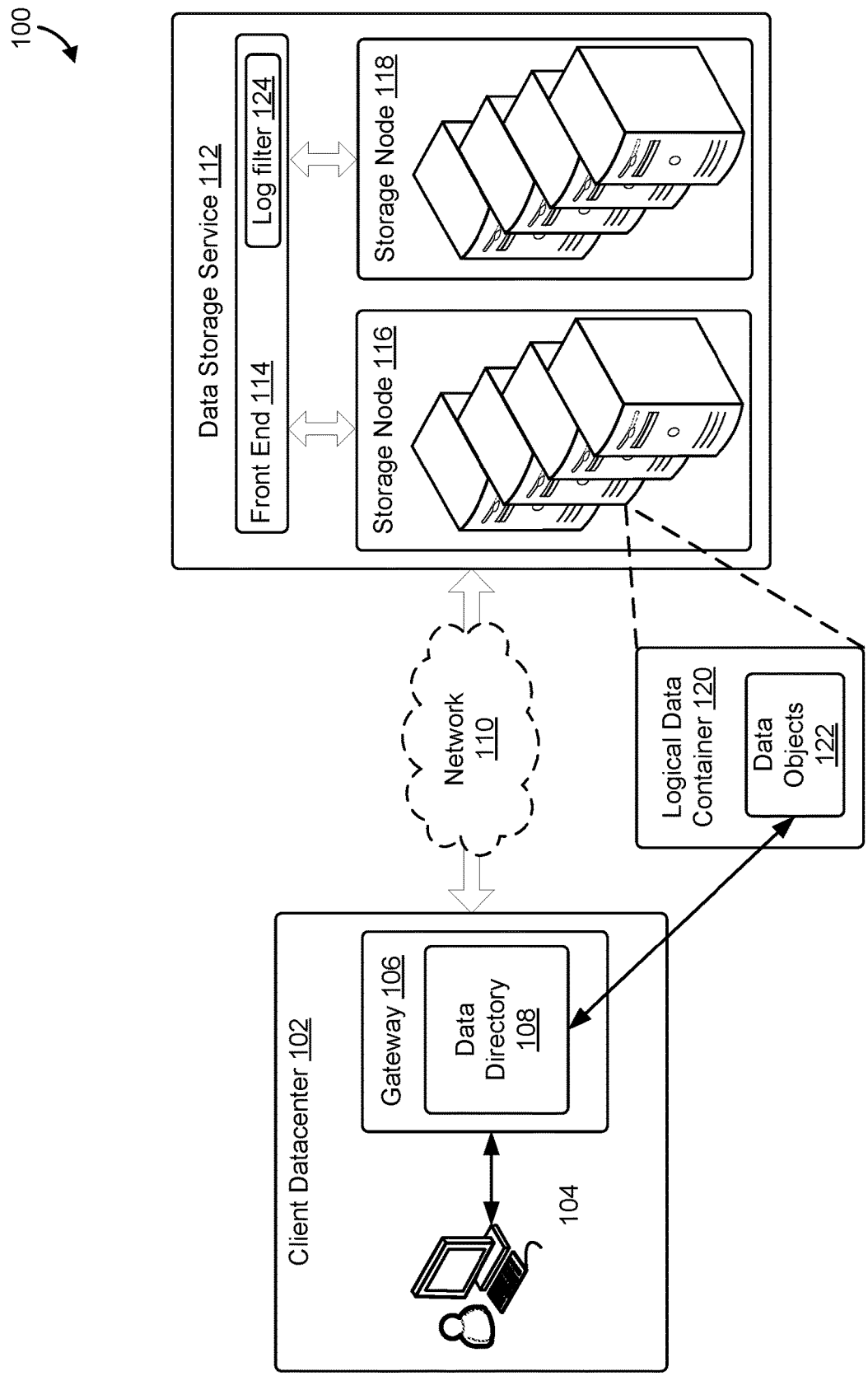
FIG. 1 illustrates an example data storage system, in accordance with at least one embodiment.

Systems and methods are described herein for more efficiently updating a data directory that maps data objects stored by a data storage service. In some examples, a data storage service, such as an on-demand data storage service may store and manage a large number of data objects, which may be accessed by a variety of client devices. Some of these client devices may access the data storage service through a gateway, which may be or may be hosted by a collection of computing resources remote from the data storage service, such as of an on premise datacenter at a client. The gateway may maintain a directory of some or all of the data objects stored by the data storage service and in some cases, may maintain local copies of the data objects themselves to reduce latency in accessing the data objects by local client devices. In order to more efficiently update the data directory, maintained by the gateway, a log filter or data filter may be implemented that filters the log of events generated by the data storage service that details various operations performed on the data. The log filter may, in some cases, remove entries corresponding to operations performed on data objects not of relevance to the gateway. The log filter may then generate a filtered log, which can be accessed by the gateway to efficiently and quickly update the data directory, to ensure that the gateway has an accurate directory of data stored on behalf of the client in the data storage service. This update process may significantly reduce the amount of resources typically needed to keep the directory up to date, such as by comparing all of the data to the directory, rather than just keeping track of changes to the directory.

In some cases, a gateway may receive updates corresponding to modifications made to the data by or through that specific gateway. In cases where multiple gateways, or even multiple interfaces are provided for accessing and modifying the data in the data storage service, the log may be filtered to remove the updates made by the specific gateway, as it may already have a record of those changes and can update the directory accordingly. In this way, redundant log entries may be removed, enabling more efficient resource usage and more efficient directory updating. In some cases, a set of data objects that are relevant or of interest, for example, to a client device or gateway, may be configurable. In this example, the log filter may first obtain or identify the relevant data objects, such as from the gateway or directory itself, and then filter the log stream generated by the data storage service accordingly. In other cases, the described system may be adaptable, such that, using machine learning and other techniques, it may select and/or modify the set of data objects that are relevant to a given directory, and filter the log and update the directory accordingly.

In some aspects, the filtered log generated by the log filter may be stored by the data storage service, such as in a queue, for a limited or configurable amount of time. In some cases, the directory may have a time to live, or expiration, such when that time is up, the directory may request an update from the data storage service/log filter. The log filter may obtain logs stored in the queue since the last update and may send those to the gateway to cause the directory to be updated. In some cases, to ensure accuracy of the directory, periodically, the directory may request a full refresh, such that compares all of the data objects stored on behalf of the client to the directory and updates any inaccuracies.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1), reducing the amount of computational and network resources used to keep a data directory of data objects stored in a data storage service up to date and accurate and (2), reducing the amount of time needed to update a directory of a data storage service maintained apart from the data storage service, etc.

FIG. 1 illustrates an example environment 100, including a client data center 102 interacting with a data storage service 112. The data storage service 112 may manage and store data on various nodes 116, 118, on behalf of one or more clients 104. The data storage service 112 may include a front end process or computing device or devices 114 which may interface with various clients 104 over one or more networks 110 to store and manage data objects 122 in one or more buckets or logical data containers 120 on behalf of clients 104.

Data storage service 112 may be an on-demand data storage service, such as an object-based data storage service. The data storage service 112 may be a service provided by a computing resource service provider. The data storage service 112 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The data stored in the data storage service 112 may be organized into data objects, such as data objects 122. The data objects 122 may have arbitrary sizes and may, in some instances, have constraints on size. Thus, the data storage service 112 may store numerous data objects of varying sizes. The data storage service 112 may operate as a key value store that associates data objects with identifiers of the data objects which may be used by the customer 104 to retrieve or perform other operations in connection with the data objects 122 stored by the data storage service 112. Access to the object-based data storage service 104 may be through application programming interface (API) calls to the service or via an interface, such as a graphical user interface (GUI).

It should be appreciated the described systems and techniques are equally applicable to other, non-object based data storage systems, such as block data storage, table-oriented data storage, relational databases, and the like. However, for consistency and ease of reference, the described techniques will primarily be described in relation to object-based data storage systems.

Client device 104 may be any appropriate device or collection of devices operable to send and/or receive requests, messages, or information over an appropriate network and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The client device 104 may interact with a client data center 102 via one or more networks. The client data center 102 may be proximately located to the client device 104, such as on premise at a client, etc. The client device 104, either directly or through the datacenter 102 may interact with data storage service 112 over one or more networks 110. The network 110 can include any appropriate network, including an intranet, the Internet, a cellular network, a local area network, a satellite network or any other such network and/or combination thereof. The data storage system 112 may be a data storage system, such as a data storage system of a computing resource service provider as described in further detail below, in reference to FIG. 8.

The client data center 102 may host or provide a gateway 106, which interacts with the data storage service 112. The gateway 106 may be a process and/or one or more computing devices, such as physical computing devices, virtualized computing devices, or a combination thereof. Gateway 106, in some cases, may be hosted by a virtual machine or machines, software containers, etc., provided by a computing resource service provider, such as that may also provide the data storage service 112. The gateway 106 may provide a simple solution for presenting one or more logical data containers or buckets 120 and the data objects 122 stored therein as a mountable network file system to one or more clients on-premises, such as via client data center 102 and/or client device 104. The gateway 106 may be deployed in the form of a virtual appliance that can run either in a VMware environment or in a virtualized resources provided as a service. The gateway 106, when deployed in a privately hosted VMware environment, may improve or optimize the connection between an on premise client file system and the logical data container 120. The gateway 106 may utilize locally attached storage to the client data center 102 to provide a read/write cache to reduce latency in performing operations on and accessing data stored by the data storage service 112. In some cases the cache may include a data directory 108, which maps data stored in one or more logical data containers 120 associated with the client 104 or gateway 102. The gateway 106 may support or format the directory 108 in various formats, including Network File System (NFS), Server Message Block (SMB), or others.

Gateway 106 may be configurable by a client device 104, such as to maintain a directory 108 of some or all data objects 122 of one or more logical data containers 120 managed by data storage service 112. In some aspects, each logical data container 120 of a client account may map to a separate data directory 108. In some aspects, a client device 104 or datacenter 102 may store data in more than one logical data container 120. In this scenario, the gateway 106 may maintain a combined data directory or individual data directories 108 for each logical data container 120. In some aspects, the scope of data in directory 106 may be configurable apart from the underlying logical data container or containers 120 accessed by the directory 108.

The gateway 106 may receive requests, such as to access or store data in or from one or more logical data containers or partitions 120, from one or more client devices 104. The gateway 106 may interact with the data storage service 112 to facilitate accessing or storing the one or more data objects. In some cases, when the gateway 106 receives a request to store data on behalf of a client, the gateway 106 may store the data object locally, such as in memory of the datacenter 102, and in some cases, may instruct the data storage service 112 to store the data object in the logical data container 120. In some cases, the objects may be identically or similarly named for ease of future access.

As part of the gateway 106 deployment, dedicated local storage of the datacenter 102 may be allocated to provide a read/write cache for all hosted directories 108. The read/write cache may greatly improve response times for data operations in the datacenter 102 where the gateway 106 is hosted. The cache may store both recently written and recently read content, and in some cases, may not proactively evict data while the cache disk has free space. However, when the cache is full, the gateway 106 may evict data based on a least recently used (LRU) algorithm. Recently accessed data may be available for reads, such that write operations may not impeded. When a client 104 performs a read request, the gateway 106 may first check the local cache for the requested data. If the data is not in the cache, the gateway 106 may retrieve the data from the logical data container 120 using Range GET requests to minimize data transferred over the network 110 while repopulating the read cache on behalf of the client.

In some aspects, when a file is written to the gateway 106, the gateway 106 may first commit the write to the local cache. The gateway 106 may acknowledge the write success to the client 104, which enables low latency on writes. After the write cache is populated, the file is put into the associated logical data container 120 asynchronously to increase local performance of transfers. When an existing file or data object is modified, the gateway 106 may transfer only the newly written data to the associated logical data container 120, using application programming interface (API) calls to construct a new object from a previous version in combination with the newly uploaded data. This feature reduces the amount of data that is required to be transferred when clients 104 modify existing files within the gateway 106.

When a client 104 creates a mount point (share) on a deployed gateway 106, a single logical data container 120 may be selected to be the persistent object storage for files and their associated metadata (data objects 122). As part of the configuration of the mount point, default permissions may be defined. These permissions may be applied to all existing objects 122 in the logical data container 120. This ensures that clients 104 that access the mount point adhere to file and directory-level security for existing content.

In some cases, access to files or data objects that are stored directly with the data storage service 112 may be secured by policies stored and maintained by the data storage service 112 itself, and/or an identity and access management system that interacts with the data storage service 112, such as provided by a computing resource service provider. Some or all other attributes, such as storage class and creation date, may be stored in a given object's metadata. In some cases, file or object permissions, folder permissions, and attributes may be stored by the gateway 106, as object metadata in the data storage service 112, or a combination thereof. In some cases, if the permissions are changed on a file or data object through the directory 108, the gateway 106 may modify the metadata of the associated objects that are stored in the logical data container 120 to reflect the changes.

In some cases, to reduce both latency and the number of operations when performing list operations, the gateway 106 may store and maintain a local logical data container 120 inventory or directory 108 that contains a record of all recently listed objects and/or other objects 122 in the logical data container 120. The directory 108 may be populated on-demand as client 104 list parts of the share for the first time. The gateway 106 may update inventory or directory 108 records only when the gateway 106 itself modifies, deletes, or creates new objects on behalf of client 104.

In some cases, gateway 106 may recognize/be aware of changes it makes to the associated logical data container 120, changes made to objects by other file gateways when the affected objects are located in folders (or prefixes) that have not been queried by that particular gateway 106, and/or changes in an associated logical data container 120 made by other contributors after a full refresh of the entire container 120 has been performed. In some cases, a gateway or mount point to access the logical data container 120 may be configured to be read-only to avoid any contemporaneous write issues and/or data consistency problems. Various control mechanisms can be employed in the case of multiple gateways or multiple access points to the logical data container 120, as are known in the art.

However, if objects are changed in a logical data container 120 by a secondary gateway or via API calls via another data storage interface that does not interface with gateway 106, the gateway 106 may not be made aware of those changes. As a result, the directory 108 may not accurately reflect the data objects 122 stored in logical data container 120, and may thus not be useful to client 104. In some cases, to update the directory when other actors modify one or more data objects 122, a full refresh of the directory 108 may be performed. This may include, via one or more API calls, the gateway 106 requesting the data storage service 112 to inventory all data objects 122 stored in logical data container 120. The data storage service 112, via the front end 104, may perform the request and return to the gateway 106, the inventory or directory or updates thereto. However, as can be appreciated, this process may be time consuming and resource intensive, depending on the size and number of data objects 122 in logical data storage 120, upon how frequently the update is requested, etc., as this process may require inventorying all data objects 122 in the logical data container 120.

In order to address this and other problems, a log filter 124 may be implemented by the data storage service 112. The log filter 124 may be a process executed by one or more computing devices of the data storage service 112. Each node 116, 118 of the data storage service 112 may generate and maintain a log of operations performed on data stored by the respective node. In some cases, the nodes may generate these logs per logical data container 120. The log filter 124 may obtain these logs, and filter them, in order to remove irrelevant and/or duplicative or redundant entries. In some cases, the log filter 124 may only retain log entries that correspond to changes made to objects listed in the data directory 108, may use historical access information to predict or determine what entries may be relevant to the directory 106, may remove operations performed by or through the gateway 106 itself, or a combination thereof. The front end 114 may store the filter logs, for example, to enable access by the gateway 106 to those logs. In some aspects the log filter and/or log storage may be implemented by application server 808 and/or log storage 814 described below in reference to FIG. 8.

The gateway 106 may access the saved filtered logs and update only portions of the directory that are affected by the entries contained in the filtered log. In some cases, the gateway 106 may request the filtered logs to perform the updates, such a periodically, or upon the occurrence of a triggering event. In some cases, the data storage service 112 may push the filtered logs to the gateway 106, such as periodically, when the logs reach a certain size, or upon some other triggering event. In this way, updates may be performed on the data directory 108 in near real time, without requiring an examination of and inventorying the entire logical data container 120.

In some cases, the described techniques may be particularly useful, for example, when devices outside of the gateway 106 or data center 102 have access to and can modify data objects 122. The described directory updating process may save both time and resources in updating the directory 108, when compared to traditional methods of updating such a directory 108.

Figure 2:
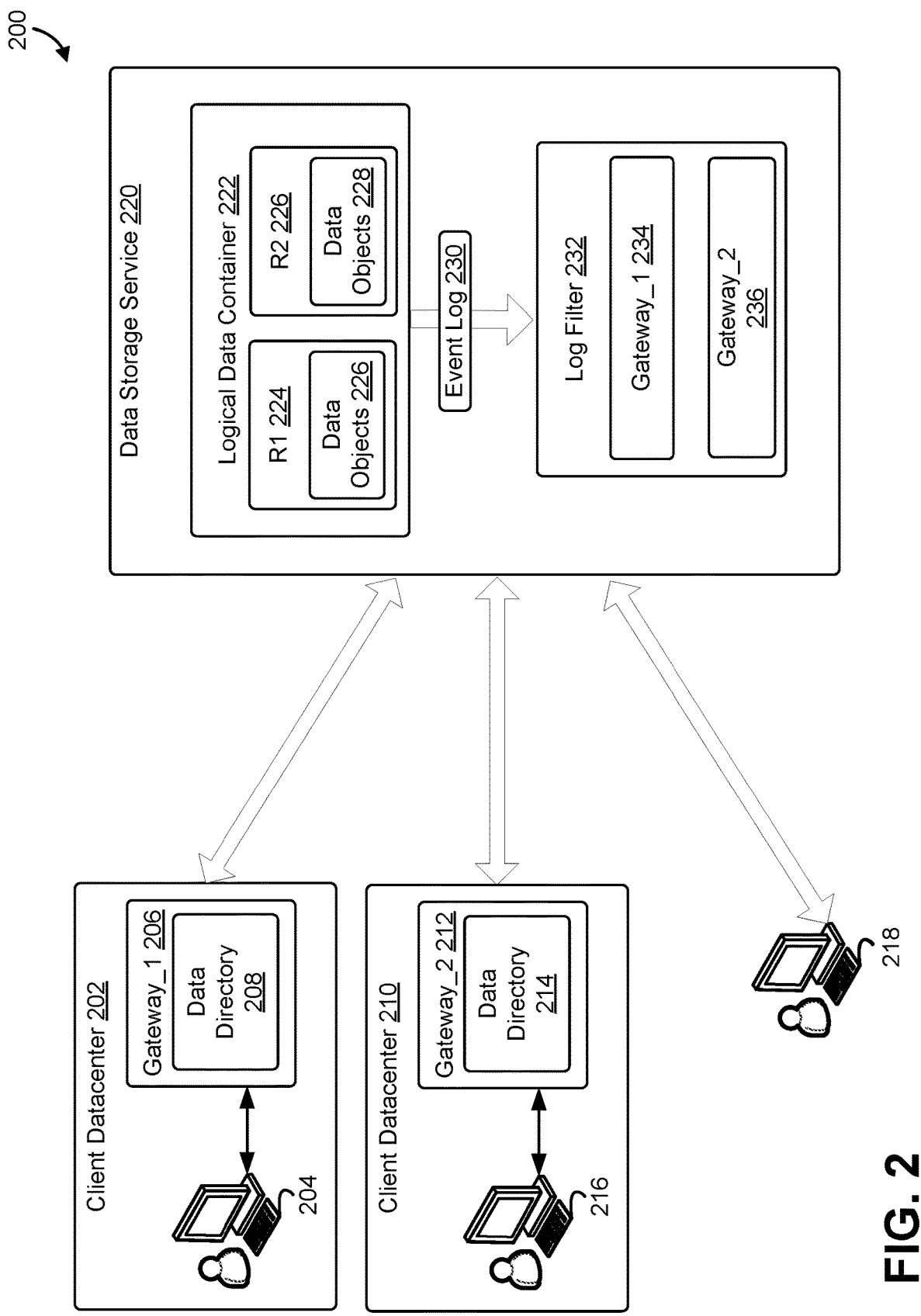
FIG. 2 illustrates another example data storage system, in accordance with at least one embodiment.

FIG. 2 illustrates another environment 200 in which the described directory updating techniques may be implemented and performed. Environment 200 may include two or more data centers 202, 210, each serving clients 204 and 216 to access data stored by a logical data container 222 via gateways 206, 212. The data storage service 220, datacenters 202, 210, gateways 206, 212, and directories 208, 214 may include one or more aspects of similarly named components described above in reference to FIG. 1, and for the sake of brevity, will not be described again here.

As illustrated in FIG. 2, two or more datacenters 202, 210 may interact with a single logical data container 222 managed by a data storage service 220. Each datacenter 202, 210 may have its own gateway 206, 212, which each may maintain a data directory 208, 214. In some cases, directories 208 and 214 may include an inventory of the same data objects, such as some or all of data objects 226, 228 stored in logical data container 222. In other cases the directories 208, 214 may maintain information concerning different data objects, such that may partially overlap, or not overlap at all. In yet some examples, another client device 218 may access and/or modify data objects 226, 228 stored in the logical data container 222 directly, without going through a gateway, such as via a web interface or other data storage interface utilizing one or a number of API calls. The described directory updating techniques may be particularly useful when multiple client devices 204, 216, and 218 interact with data objects 226, 228. In this scenario, gateway 206 may not be aware of changes made to data objects 226, 228, may through another gateway 214 or directly by a client device 218.

In the example illustrated, a log filter 232 may be employed through or by the data storage service 220. The log filter 232 may obtain entries indicating operations performed on one or more of data objects 226, 228, as contained in an event log 230. The event log 230 may include all operations performed on the data objects 226, 228. The log filter 232 may employ different filters for different gateways, such as gateways 206, 212, and store the resultant filtered logs in different queues, such as queues 234 and 236. The respective gateways 206, 212 may access (or receive) the filtered logs 234, 236 to update their respective directories 208, 214.

In some aspects, the logical data container 222 may be divided into regions R1 224, and region R2 238, or may be divided in a number of different ways. In some cases, regions 224, 238 may correspond to different geographical regions, such as stored by different nodes of a data storage service 220. In other cases, regions 224, 238 may correspond to different tiers of data storage, such as may be associated with different access requirements or latency, durability, cost, etc. In some cases, the filters that generated filtered logs 234, 236, may be oriented relative to the regions 224, 238, such that gateway 234 retains logs of changes made to data objects 226, and gateway 236 retains logs of changes made to data objects 228. In other cases, log filters 234 236 may retain logs of operations performed on all or a subset of data objects 226, 228 regardless of which region the data objects are in.

In some examples, the event logs 230 may include any of a number of pieces of information and be formatted in any of a number of ways. For example, the log may include entries that include an identifier of the data object or partition of data that was affected by an operation, a timestamp of the operation being performed or completed, and an identifier of the actor or gateway that initiated the operation (e.g., IP address, or other identifier), In some cases, the entry may also indicate whether the operation was performed successfully. In other cases, data of operations performed on data objects 226, 228 of a logical data container 222 may not be contained on a log, may take various other forms, such as a data stream, and the like. As used herein, an event log may also refer to event data, which may not be captured in a formal log, but which may include attributes of operations being performed on the data in any of a variety of formats.

Figure 3:
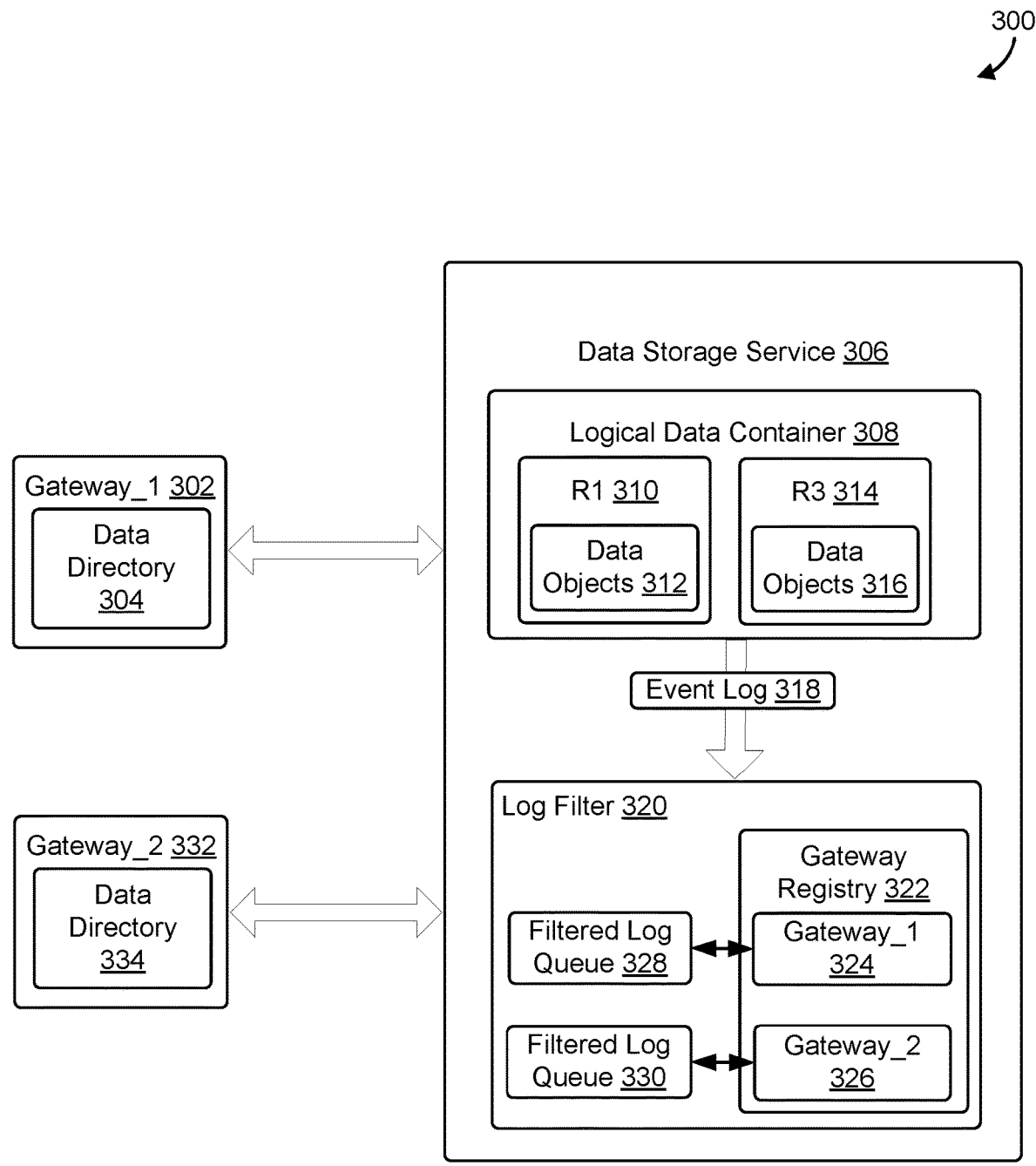
FIG. 3 illustrates another example data storage system, in accordance with at least one embodiment.

FIG. 3 illustrates another environment 300 in which the described directory updating techniques may be implemented and performed. Environment 300 may include two or more data gateways 302, 332 each serving one or more clients to access data stored by a logical data container 308 stored by data storage service 306. The data storage service 306, gateways 302, 332, and directories 304, 334 may include one or more aspects of similarly named components described above in reference to FIGS. 1 and 2, and for the sake of brevity, will not be described again here.

Log filter 320 may differ from log filter 232 in that it may also include a gateway registry 322. Gateway registry may be or include a process or component of the log filter 320, and may be provided by one or more physical and/or virtual computing resources. Gateway registry 322 may include registries 324, 326 for each gateway 302, 332, that may access or be registered with a logical data container 308. Each registry may include a list or otherwise indicate which data objects of data objects 312 and/or 316, which may be associated with different regions R1 310 and R3 314, that a given gateway 302, 332 has subscribed to. The log filter 320 may filter event log 318 according to which data objects are indicated in the corresponding registry 324, 326, and store the resultant filtered log per gateway in a corresponding filtered log queue 328, 330. The filtered log queue 328, 330 may then be used to update the corresponding directory 304, 334 via a variety of mechanisms, including a manual or periodic request format, a push format, and so on.

In some cases, a registry, such as registry 324 may be generated automatically, such that registry 324 may be generated by determining what objects are listed in directory 304. This may be accomplished, for example, by the log filter 320 or other component of the data storage service 306, querying or requesting from gateway 302 a copy of its directory or changes made thereto since a last registry refresh. In other cases, the gateway 302 may push updates made to directory 304 to registry 324, and the registry 324 in response, may modify the filter for the registry 324 to include or exclude log entries corresponding to the added or deleted data objects.

In some cases, a user or admin of the gateway 302 may select which objects to be included in the directory 304, and the registry may obtain that list either automatically or during the directory 304 configuration or modification process. In a similar way. Data objects included in the directory 304 may be manually changed at any point in time, and/or in combination with other directory updating techniques and/or other registry selection techniques.

In yet some cases, the registry may select which objects to include or retain in a queue 328, 330 via one or more machine learning techniques or other predictive algorithms. For example, registry 324 may obtain a list of objects include in directory 304. The registry 324 may track how that list of objects changes over a given period of time. The registry 324 may use that information and potentially other information, as training data to build one or more models of what data objects are likely to be accessed through gateway 302, and accordingly change the entries retained and stored in filtered log queue 328. The training data include historical data object access information, and/or may interact with the data objects 312, 316 themselves or other services that may gather information concerning the data objects maintained and stored by logical data container 308. For example, the registry 324 or a separate service acting on behalf of the registry 324 may determine key words or other identifiers that may relate to data objects already included in the directory 304. The registry 324 or service may then determine which data objects include those key words, and include or retain entries corresponding to those additional data objects in the filtered log queue 328.

In some aspects, the contents of queues 328, 330 may be erased or purged in order to store further log entries. In some cases, upon confirmation of a gateway receiving a filtered log, the queue may subsequently purge it contents to make room for future log entries.

Figure 4:
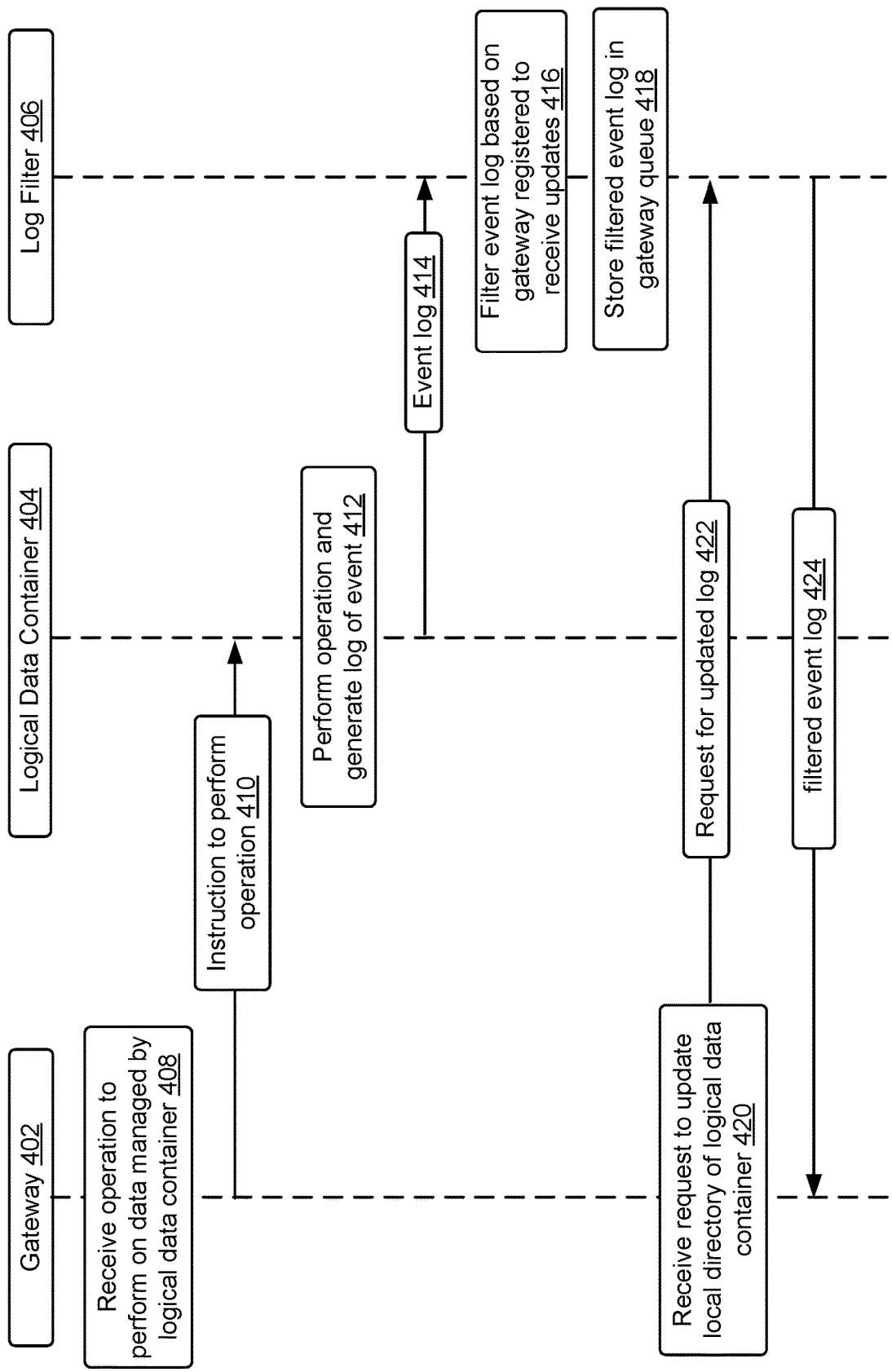
FIG. 4 illustrates example interactions between a customer gateway and aspects of a data storage system, in accordance with at least one embodiment.

FIG. 4 illustrates example interactions 400 between a customer gateway and aspects of a data storage system, in accordance with at least one embodiment. Example interactions 400 may be between a gateway 402, a logical data container 404, and a log filter 406. Gateway 402, logical data container 404, and log filter 406 may include one or more aspects of similarly named components described above in reference to FIG. 1, 2 or 3, and will not be repeated again here.

In one example, a gateway 402 may receive instructions to perform an operation on data, such as a data object, which may be managed by the gateway 402 and stored by a data storage service, at operation 408. In some cases, the gateway 402 may process the request and store data associated with the request, such as new or modified data, or an instruction to delete existing data, in a local cache. In this example, the gateway 402 may immediately send the instruction to perform the operation to a data storage service, at operation 410, or may wait, for example, for a certain time to send the instruction for a number of reasons, such as until the local cache is full, until network utilization or traffic drops below a threshold, and the like. Upon receiving the instruction to perform the operation on the data, the data storage service, e.g., through a front end host or system, may instruct the relevant logical data container 404 to perform the operation, at operation 412. Also at operation 412, the logical data container 404 may generate a log entry of the operation, which may include a data object identifier, an indication of the operation performed (added, modified, deleted, etc.), a time stamp of when the operation was performed, and/or other information. The logical data container 404 may push or send the entry in an event log to a log filter 406, at operation 414.

The log filter 406 may filter the event log 414, at operation 416, which may include any of a number of entries corresponding to operations performed on data stored in the logical data container 404. The filtering may include various operations, including removing entries corresponding to a specific gateway 402, retaining entries correspond to data objects of interest to the gateway 402, and the like, as described in greater detail above. The log filter 406 may store the filtered log in a queue or other storage associated with the specific gateway 402, at operation 418.

In some aspects, the gateway may request to update its local data object directory, at operation 420, such as by sending a request 422 to a data storage service. The data storage service may access or obtain the filtered event log from the log filtered 406 and send the filtered log back to the gateway 402 in response to the request, at operation 424. The gateway 402 may then update its directory using the filtered event log. In some cases, the actual filtered event log may be modified in any of a number of ways either before storing or before sending to the gateway to update its directory.

Figure 5:
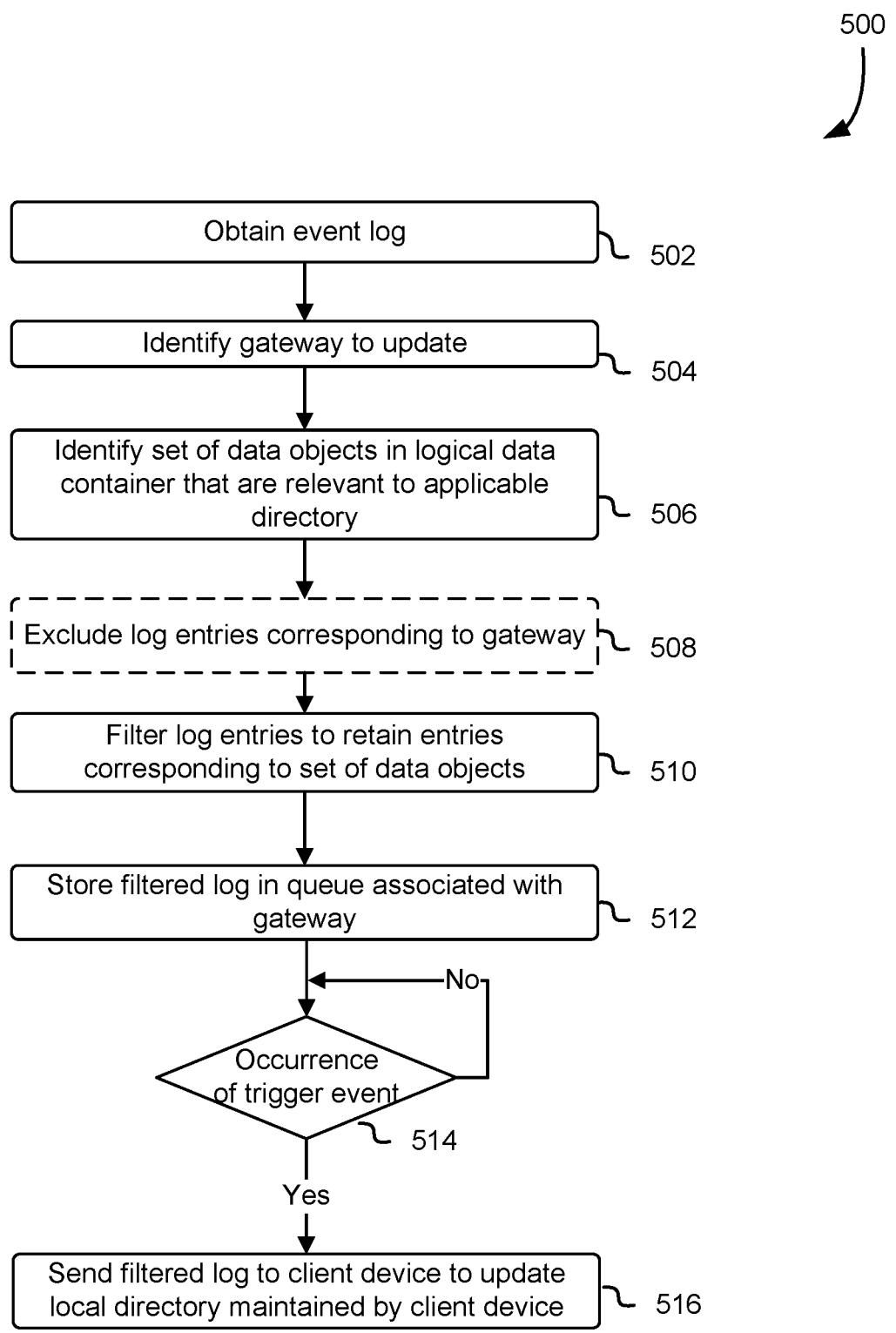
FIG. 5 illustrates an example process for updating a directory of a client gateway, in accordance with at least one embodiment.

FIG. 5 illustrates an example process 500 for updating a directory of a client gateway, in accordance with at least one embodiment. One or more operations of process 500, in some aspects, may be performed by one or more aspects of a data storage service, such as a front end host 114, a log filter 124, 232, 320, a log queue 234, 236, gateway registry 322, 324, 326, and/or filtered log queues 328, 330, and/or aspects of a gateway, such as a data directory.

Process 500 may begin at operation 502, where a log filter or front end host or system may obtain an event log generated by a data partition or logical data container of a data storage service. The log filter/front end may then identify a directory of one or more gateways to update at operation 504. The log filter may then identify a set of data objects in a specified logical data container that are relevant to a directory of the selected gateway, at operation 506. Operation 506 may include accessing a gateway registry to determine which data objects are relevant to the particular gateway. In other cases, operation 506 may include obtaining a listing of the data objects in the directory itself to select relevant data objects. In some examples, process 500 may include operation 508, where operations performed or initiated by the specified gateway may be excluded from the event log or stream.

Next, at operation 510, the log entries may be filtered to retain entries that correspond to the set of data objects determined to be relevant to the gateway, at operation 506. In some aspects, the filtered event log may then be stored in a queue or other storage location associated with the gateway, at operation 512. In some aspects, process 500 may continue to check for a triggering event, at operation 514, and upon trigger event occurring, may send the filtered event log to the client device or gateway to update the local directory maintained by the client device/gateway, at operation 516. In some cases, the triggering event may be the passage of a predetermined or configurable amount of time since prior update of the local directory, a number or size of entries being stored in the queue reaching a threshold number or size, or upon receiving a specific request from the client device/gateway, for example.

Figure 6:
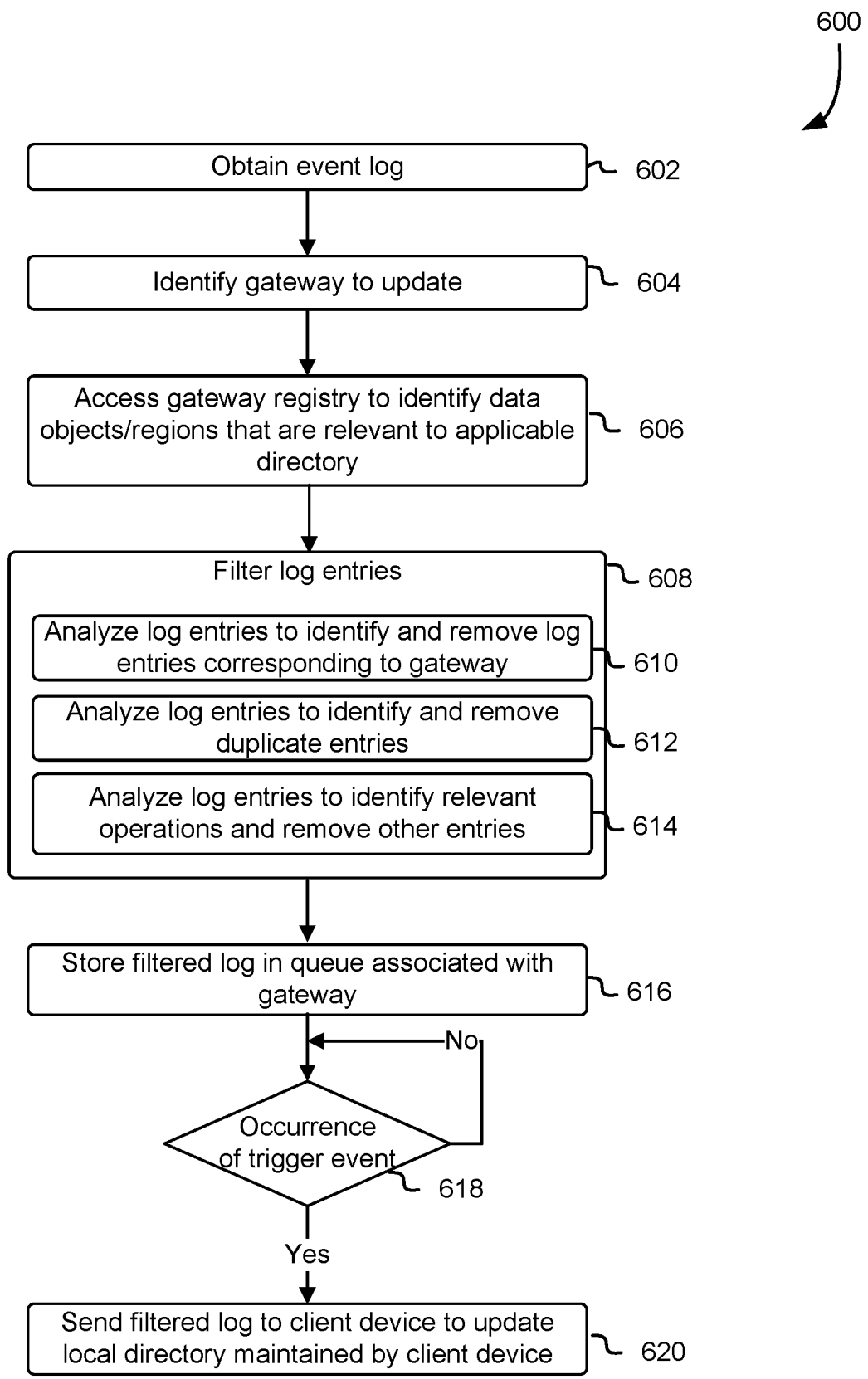
FIG. 6 illustrates another example process for updating a directory of a client gateway, in accordance with at least one embodiment.

FIG. 6 illustrates another example process 600 for updating a directory of a client gateway, in accordance with at least one embodiment. One or more operations of process 600, in some aspects, may be performed by one or more aspects of a data storage service, such as a front end host 114, a log filter 124, 232, 320, a log queue 234, 236, gateway registry 322, 324, 326, and/or filtered log queues 328, 330, and/or aspects of a gateway, such as a data directory.

Process 600 may begin at operation 602, where a log filter may obtain an event log generated by a data partition or logical data container of a data storage service. The log filter may then identify a directory of one or more gateways to update at operation 604. The log filter may then access a gateway registry to identify a set of data objects and/or one or more regions in a specified logical data container that are relevant to a directory of the selected gateway, at operation 606.

Next, at operation 608, the log entries may be filtered to retain entries that correspond to the set of data objects determined to be relevant to the gateway. In some aspects, operation 608 may include analyzing the log entries to identify and remove log entries corresponding to the selected gateway, as that gateway may already be aware of changes made to the logical data volume, and hence updating its own directory, at operation 610. In yet some aspects, operation 608 may additionally or alternatively include analyzing the log entries to identify and remove duplicative entries, at operation 612. In some cases, this may include removing multiple entries that indicate the same change to one or more data objects. In yet some examples, operation 612 may include removing entries that do not correspond to changes to data objects that would affect a directory of such objects. These types of irrelevant operations may include just accessing a data object and not modifying it. In some cases, if multiple operations are performed on the same data object, the entries may be analyzed to determine if all of the entries need to be included to correctly update the directory, or if only a subset of the multiple entries need to be induced. For example, a first operation may include rewriting a data object with a second data object. A subsequent operation may include rewriting the second data object with a third data object. In this example, it may be more efficient, while still maintaining accuracy, to only include the entry that corresponds to the final change to the data object. This may be permed by searching for a replace or rewrite operation and tracking a subsequent changes to that data object. In some aspects, it would be appreciated that for a variety of design reasons, it may be more efficient, such as to perform quicker updating or use less computing resources, to limit more complex filtering of the log entries, and simply have the directory updating a listing twice.

In yet some aspects, operation 608 may additionally or alternatively include operation 614, in which the log entries may be analyzed to identify and retain relevant operations (e.g., relating to one or more specified or relevant data objects), and remove other entries. In some aspects, operation 614 may include utilizing one or more models, such as generated using training data, to determine which data objects are relevant to a given directory.

In some aspects, the filtered event log may then be stored in a queue or other storage location associated with the gateway, at operation 616. In some aspects, process 600 may continue to check for a triggering event, at operation 618, and upon a trigger event occurring, may send the filtered event log to the client device or gateway to update the local directory maintained by the client device/gateway, at operation 620.

In other example, one or more of operations of process 600 may be performed by a gateway, client data center or even a client device. For example, a log filter may only retain log entries relevant to a given gateway using a course filter, such as removing entries corresponding to operations performed by the specific gateway. The rest of the filtering and updating may subsequently be performed on the client or gateway side. In some aspects, the gateway itself may direct or perform the some or all of the steps of generating a model and utilizing machine learning to predict what data objects will be relevant to users of a specific directory, as the gateway itself may have a record or a more complete record of data that is accessed through a specific gateway.

Figure 7:
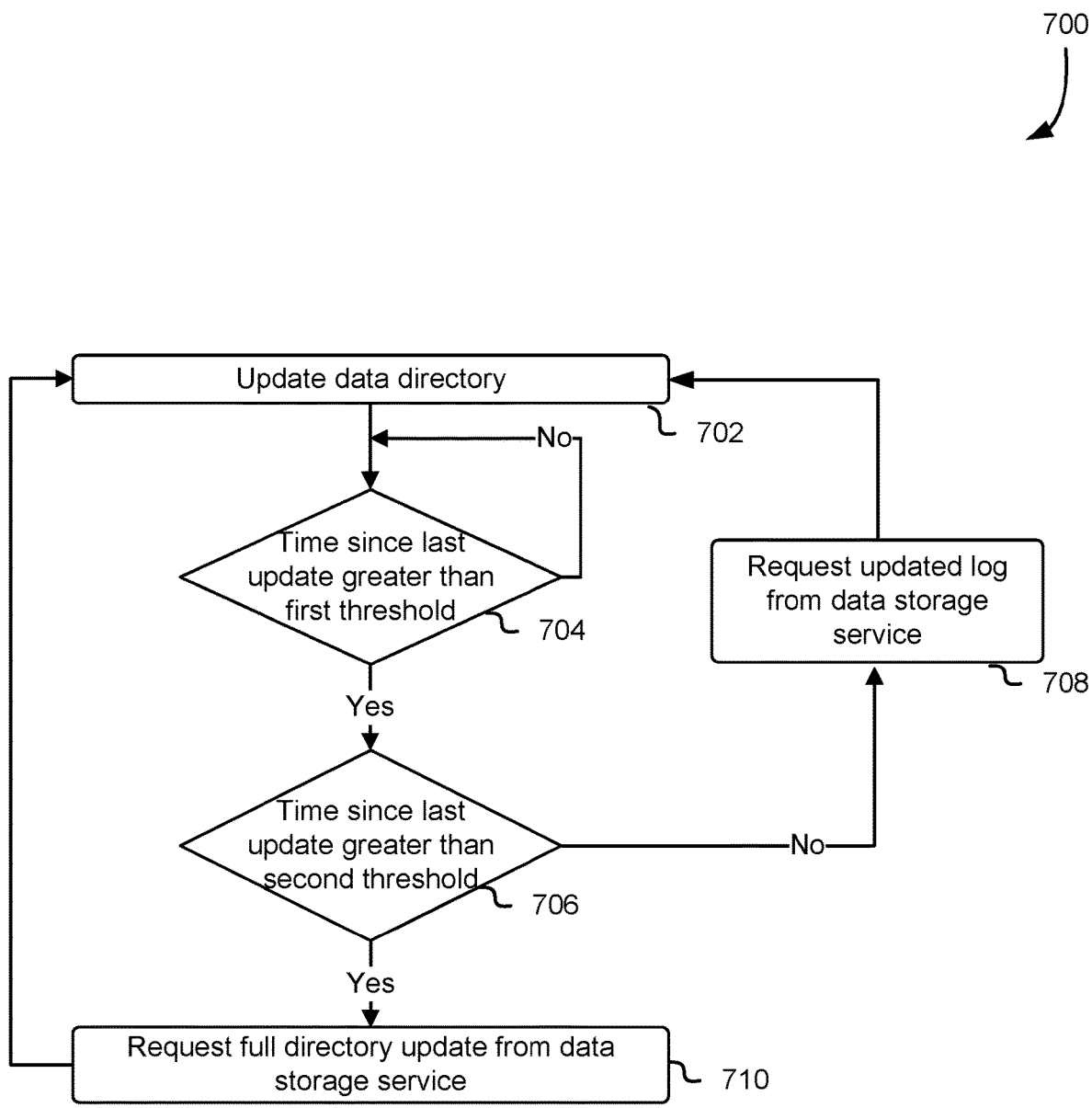
FIG. 7 illustrates an example process for updating a directory of a client gateway by the client gateway, in accordance with at least one embodiment.

FIG. 7 illustrates an example process 700 for updating a directory of a client gateway, as may be performed by the client gateway, in accordance with at least one embodiment. Process 700 may be performed by a client device, a client datacenter, and/or a gateway associated with client device or datacenter, as described in greater detail above, in coordination with a data storage service.

Process 700 may begin at operation 702, in which a gateway may update a data directory maintained by the gateway. In some aspects, operation 702 may include part or all of process 500 and/or 600 described above, in coordination with a data storage service. The gateway may utilize a first time threshold, which may be configurable or determined based on access patterns of the gateway, to determine if the directory needs to be updated again, at operation 704. If the time threshold has not been met, the gateway may periodically continue to check to see if the threshold has been met. The gateway may then determine, at operation 706, whether a time period since the last update is greater than a second threshold, which may also be configurable. The second threshold may larger or longer than the first threshold and may represent a time period, the passage of which, would necessitate or make it cost effective, to perform a full directory update (e.g., analyzing all data object in the corresponding logical data unit) from the data storage service, to ensure that the directory is accurate and no operations have inadvertently been omitted from the directory.

If only the first threshold has been met or exceeded, the gateway may request an updated log (e.g., not including or necessitating an entire refresh of the directory), at operation 708, and process 700 may repeat starting with the gateway performing the directory update at operation 702. If the second threshold has been met or exceeded, the gateway may request a full directory update from the data storage service, at operation 710. Process 700 may the repeat back to operations 702, and so on.

Figure 8:
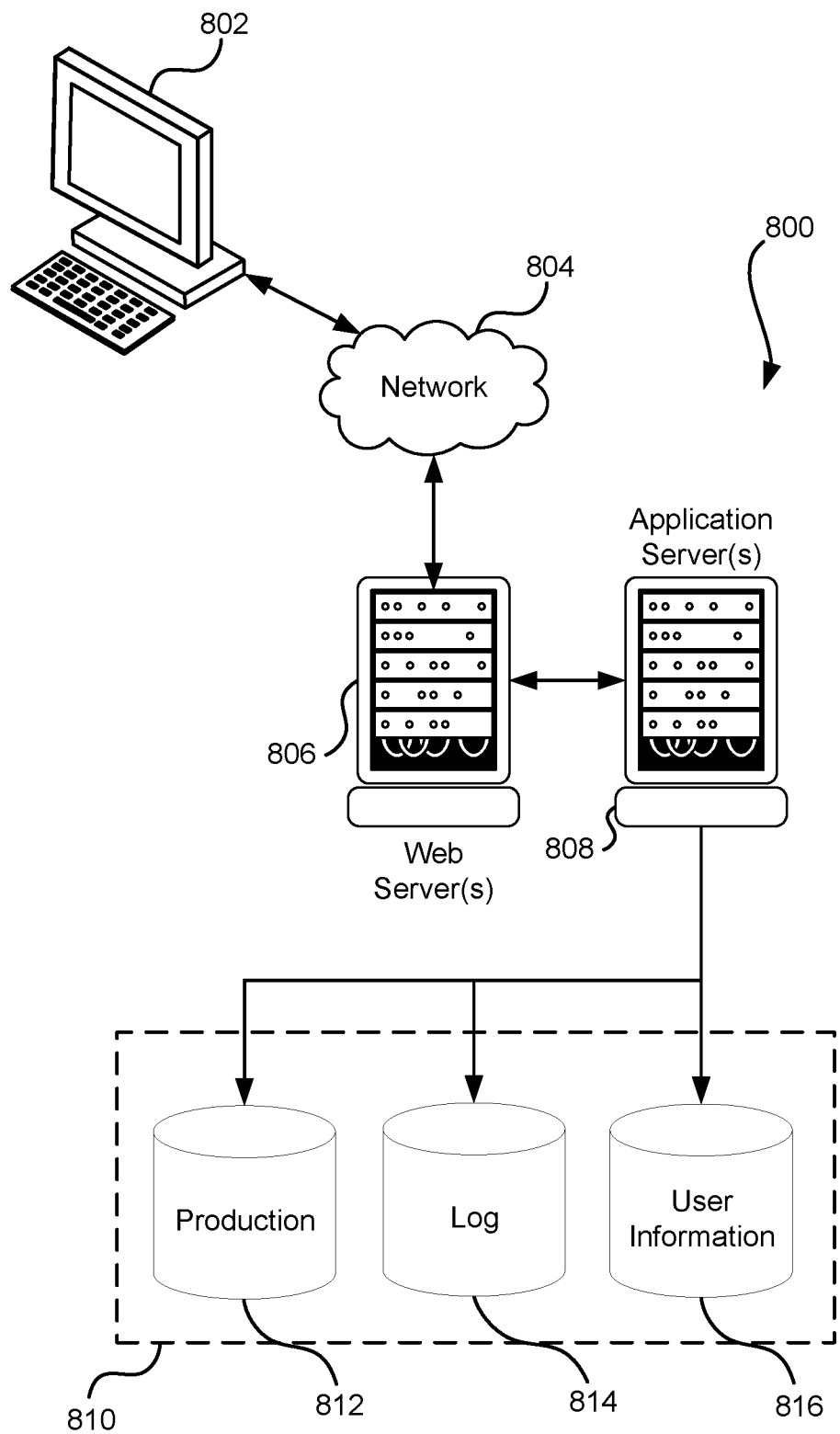
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-to p boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining an event log from a data storage service, the event log comprising log entries indicative of operations performed on a plurality of data objects managed by the data storage service, wherein the log entries are associated with one of at least two data storage interfaces, wherein individual data storage interfaces of the at least two data storage interfaces comprise a gateway associated with a client device for accessing the plurality of data objects stored by the data storage service and a directory of at least some of a plurality data objects stored by the data storage service;

filtering the event log to produce a filtered event log, wherein the filtering comprises removing log entries associated with a first data storage interface of the at least two data storage interfaces and retaining log entries associated with operations performed on data objects maintained by the first data storage interface, wherein at least some of the removed log entries comprise log entries that are not redundant to log entries associated with a second data storage interface of at least two data storage interfaces;

modifying the directory of the first data storage interface using the filtered event log to produce a modified directory, wherein the modified directory comprises data objects of the plurality of data objects accessible by the first data storage interface; and providing the modified directory to a client device associated with the first data storage interface.

2. The computer-implemented method of claim 1, wherein filtering the event log to produce the filtered event log further comprises retaining log entries corresponding to data objects of the plurality of data objects previously accessed by the client device.

3. The computer-implemented method of claim 1, wherein filtering the event log to produce the filtered event log further comprises:

generating a first set of data objects comprising data objects predicted to be accessed by the client device in the future based on prior access by the first data storage interface; and retaining log entries corresponding to the first set of data objects.

4. The computer-implemented method of claim 1, wherein the client device maintains a version of the directory, and wherein providing the modified directory to the client device is performed responsive to at least one of an occurrence of a trigger event or upon receiving a request to update the directory from the client device.

5. A system, comprising:

one or more processors; and memory that stores computer-executable instructions that, as a result of being executed, cause the one or more processors to:

obtain event data corresponding to a data storage partition of a data storage service, wherein the event data indicates a plurality of entries indicative of operations performed on a plurality of data objects stored in the data storage partition;

determine a set of data objects of the plurality of data objects identified in a directory maintained locally by a client device;

filter the event data to produce filtered event data, wherein filtering the event data comprises removing non-redundant entries of the plurality of entries not corresponding to the set of data objects; and store the filtered event data, wherein the filtered event data, as a result of being accessed by the client device, causes an application programming interface of the client device to update the directory maintained by the client device using the filtered event data to produce a modified directory.

6. The system of claim 5, wherein the event data comprises a first set of entries of the plurality of entries corresponding to operations initiated by a first data storage interface associated with the client device and a second set of entries corresponding to operations initiated by a second data storage interface.

7. The system of claim 6, wherein the client device is unaware of the second set of entries corresponding to operations initiated by the second data storage interface.

8. The system of claim 7, wherein the instructions that, as a result of being executed, further cause the one or more processors to filter the event data by removing the first set of entries from the event data to produce the filtered event data.

9. The system of claim 5, wherein the modified directory is associated with an expiration condition, and wherein the instructions that, as a result of being executed, further cause the one or more processors to, upon satisfaction of the expiration condition:

obtain second event data corresponding to the data storage partition;

filter the second event data to produce second filtered event data; and store the second filtered event data, wherein the second filtered event data, as a result of being accessed by the client device, causes the client device to update the modified directory maintained by the client device.

10. The system of claim 5, wherein the modified directory is associated with an expiration condition, and wherein the instructions that, as a result of being executed, further cause the one or more processors to purge the filtered event data after satisfaction of the expiration condition.

11. The system of claim 5, wherein the filtering further comprises:

determining a first set of data objects of the plurality of data objects based on access patterns associated with the plurality of data objects by the client device; and retaining entries of the plurality of entries corresponding to the first set of data objects.

12. The system of claim 5, wherein the directory comprises at least a subset of the plurality of data objects in the data storage partition accessed by the client device.

13. A non-transitory computer-readable storage medium storing thereon executable instructions that, as a result of being executed by one or more processors of a computer system, cause the computer system to at least:

obtain an event log corresponding to a logical data container of a data storage service, wherein the event log comprises a plurality of entries indicative of operations performed on a plurality of data objects stored in the logical data container;

identify a set of data objects of the plurality of data objects identified in a directory maintained by a client device;

filter the event log to remove entries of the plurality of entries not corresponding to the set of data objects, wherein at least some of the removed entries comprise entries that are not redundant to other entries associated with the event log; and store the filtered event log, wherein the filtered event log, as a result of being accessed by the client device, causes the client device to update the directory maintained by the client device using the filtered event log to produce a modified directory.

14. The non-transitory computer-readable storage medium of claim 13, wherein the event log comprises a first set of entries of the plurality of entries corresponding to operations initiated by a first data storage interface associated with the client device and a second set of entries corresponding to operations initiated by a second data storage interface, and wherein the client device is unaware of the second set of entries corresponding to operations initiated by the second data storage interface.

15. The non-transitory computer-readable storage medium of claim 14, wherein the instructions further comprise instructions that, as a result of being executed by the one or more processors, cause the computer system to filter the event log by removing the first set of entries from the event log to produce the filtered event log.

16. The non-transitory computer-readable storage medium of claim 13, wherein the instructions further comprise instructions that, as a result of being executed by the one or more processors, cause the computer system to:
- obtain a second event log corresponding to the logical data container;
- filter the second event log to produce a second filtered event log; and
- store the second filtered event log, wherein the second filtered event log, as a result of being accessed by the client device, causes the client device to update the modified directory maintained by the client device.

17. The non-transitory computer-readable storage medium of claim 13, wherein the modified directory is associated with an expiration condition, and wherein the instructions further comprise instructions that, as a result of being executed by the one or more processors, cause the computer system to purge the filtered event log after satisfaction of the expiration condition.

18. The non-transitory computer-readable storage medium of claim 13, wherein the instructions further comprise instructions that, as a result of being executed by the one or more processors, cause the computer system to:
- determine a first set of data objects of the plurality of data objects based on historical access patterns associated with the plurality of data objects by the client device; and
- retain entries of the plurality of entries corresponding to the first set of data objects.

19. The non-transitory computer-readable storage medium of claim 13, wherein the instructions further comprise instructions that, as a result of being executed by the one or more processors, cause the computer system to transmit the filtered event log to the client device in response to at least one of the expiration of a period of time, a size of the filtered event log meeting or exceeding a threshold size, or receiving a request from the client device for the filtered event log.

20. The non-transitory computer-readable storage medium of claim 13, wherein the directory comprises at least a subset of the plurality of data objects in the logical data container accessed by the client device.

* * * * *